July 3, 1973  J. B. JONES, JR  3,743,697
PROCESS OF CALCINATION
Filed Oct. 28, 1971  2 Sheets-Sheet 2
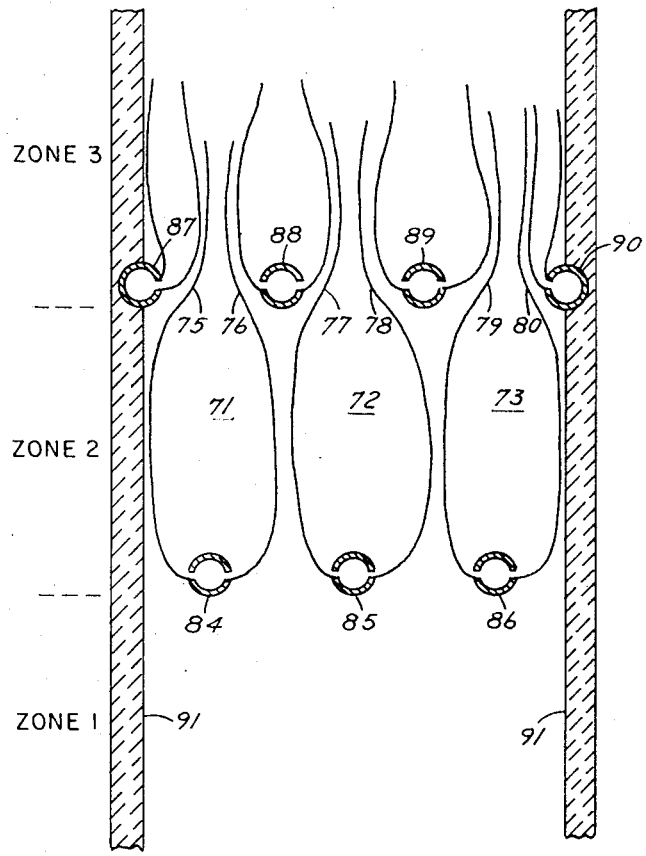
FIG. 2
FIG. 3
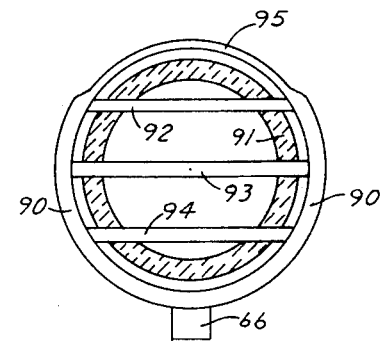
FIG. 4
INVENTOR
JOHN B. JONES
BY Richard D. Law
ATTORNEY

3,743,697
PROCESS OF CALCINATION
John B. Jones, Jr., Denver, Colo., assignor to
Paraho Corporation, Boulder, Colo.
Filed Oct. 28, 1971, Ser. No. 193,462
Int. Cl. C04b 7/44, 1/00
U.S. Cl. 423—175                                    15 Claims

ABSTRACT OF THE DISCLOSURE

A calcining process provides a vertical vessel having an upper feed and a lower product withdrawal with the introduction of a plurality of introductions of a predetermined ratio of gas-air mixture into at least three levels in the vessel producing three distinct zones to provide an expanded residence time in the vessel for the material being calcined but at controlled temperatures and high efficiency. Specifically, a process for the production of lime from precursors of lime, feeds a uniform rate of crushed stone into a vertical kiln, withdraws a quantity of lime to maintain a predetermined level of stone in the kiln; introduces a lean gas-air mixture into the bottom of the bed, a rich mixture of gas-air in a lower combustion zone and a lean mixture of gas-air in an upper combustion zone to calcine the precursors at about 80% efficiency based on the gas input.

---

Calcining, generally, is a heat treatment of a raw material to produce a chemical change in the material. For example, various carbonates decompose under heat evolving $CO_2$ leaving the corresponding oxide. Cement forming, calcination and sintering of manganese concentrates, calcination of arsenical gold ores are typical examples of calcination. While each process is dependent upon the material being treated, there are some common general principles which apply when certain types of equipment are used for the process. Thus, the present invention is applicable to calcining generally in vertical vessels, normally referred to as shaft vessels, vertical kilns, etc.

The present practices of calcining limestone and other raw material to produce lime are generally accomplished in either a rotary kiln or in a vertical kiln. A rotary kiln is effective in calcining lime raw material but is extremely expensive to install and is quite thermally inefficient, using considerably more fuel and power than is necessary in the known types of vertical kilns. In the rotary kiln, limestone or other feed is fed into one end of a slowly turning elongated tube which rolls the rock, slowly turning it towards the opposite end where it is discharged. Heating in the rotary kiln is accomplished by burning fuel at the discharge end of the kiln so that the hot gases of combustion flow through the tube to the feed end.

In a vertical type kiln several different calcining methods may be utilized. In one method, limestone and a solid fuel, which may be coal or coke, are mixed together and fed at the top of the kiln which has a grate at the bottom to slowly release material. Air is drawn in at the bottom, and sometimes at the side, to provide combustion in the mixture. Such a fuel feed method has disadvantages in that the fuel may not remain mixed uniformly throughout the limestone, or rock and a residual ash from the solid fuel may become an objectionable part of the final product. In another process, fuel is burned outside of the vertical kiln and the hot gases of combustion are drawn into the kiln at various points. Such a process has the advantages of some control of combustion and introduction of hot gases at various spots throughout the kiln; however, it has the disadvantages of requiring a secondary furnace and the control of temperature in the bed is not as accurate as desired. Another process in a vertical kiln is to provide combustion of a fluid fuel in the stone bed in the kiln. The high flame temperatures produced in the bed on combustion of the fuel create problems such as overburning in parts of the stone bed.

Limestone, chemically $CaCO_3$, has a rhombic crystalline structure; the product lime, chemically $CaO$, has a cubic crystalline structure. By careful control of calcining process, the rhombic crystalline structure of limestone is essentially retained in the lime. The rhombic crystalline form of lime is very reactive to water for hydration, whereas the cubic crystalline structure is not reactive. Overburn in a kiln will alter the rhombic crystalline structure of the product lime and, consequently, reduce its chemical activity. Therefore, temperature must be accurately controlled throughout a kiln to prevent overburn and to yield a quality product, but prior art kilns have not provided precise temperature control. Prior kilns generally do not produce uniform products when the grade and size of stone charge is changed during a run. Because the grade or size of the stone charge cannot be changed prior kilns while maintaining product uniformity during a run, prior kilns were not capable of continuous processing of lime. Another problem in prior vertical kilns was difficulty in obtaining unifrom distribution of the solids and the treating fluids. The consequent overheating in portions of the bed in such kilns caused a fusion of rock into a glomerate mass known as a "hang"; in other sections of the kiln, calcining might not be complete, producing a high core content of the incompletely burned stone.

The calcining of limestone to lime requires heat to break down the calcium carbonate in the stone. The approximate theoretical amount of heat necessary to reduce essentially pure limestone to a ton of lime is about 2.8 million B.t.u. per ton of CaO. Rotary kilns are quite inefficient in producing lime, and the necessary expenditure of heat has been from 6.5 to 10 million B.t.u. per ton of lime. In one instance, it is known that about 15 million B.t.u. per ton of lime is necessary to calcine the limestone, an efficiency of less than 19%. Rotary kilns do not generally exceed more than 45% efficiency, based on the input of the fuel. Prior art vertical kilns have utilized the heat input somewhat more efficiently than rotary kilns; however, they still use about 5.5 million to 7 million B.t.u. per ton of lime produced, and the efficiency of conversion, based on the heat input, runs from about 40% to 50%. These low efficiencies obviously result in a high cost of production of the lime.

Both rotary and prior art vertical kilns have high maintenance costs in the furnace hardware portion of the unit and in the auxiliary equipment necessary for the operation of the kiln. Prior art vertical kilns have required a high capital investment of machinery to produce a closely sized feed stone. Undersize feed stone is rejected, and, as the amount of rejected material increases, the cost of the raw stone obviously increases. Similarly, rotary kilns cannot use stone charges having a high percentage of fines without producing a large percentage of objectionable dust. Particularly the rotary kilns, and in a large measure the auxiliary equipment of the vertical kilns known in the prior art, have required high electrical energy per ton of lime produced. In terms of power in kilowatt-hours per ton (kw.h./ton), long rotary kilns generally require about 24–32 kw.h./ton, short rotary kilns about 28–36 kw.h./ton, and vertical kilns about 10–25 kw.h./ton. Both types of kiln have required a high operating manpower need per ton of lime. Thus, with the inefficiency of the process and the higher operating costs, the cost of the lime has remained high.

The kilns of the prior art, including the rotary kilns and the vertical kilns, have been induced-draft furnaces which are greatly effected by weather. Induced-draft combustion is greatly effected by air density, moisture content, air temperature, stack temperature, air leakage into the kiln, wind direction, etc. Thus, as the weather conditions change, the operating conditions must necessarily be changed. Since in induced-draft combustion the atmosphere in the kiln is non-controllable, the sulfur content of the lime product is likewise non-controllable.

Even with the disadvantages of the rotary kiln in thermal efficiency, the rotary kiln is still more widely used in the production of lime than the vertical kiln. Those vertical kilns in use are small capacity, have a small cross-section, and have a relatively high vertical extent. Many and varied approaches have been attempted in the construction and operation of vertical kilns to make them competitive with rotary kilns. Prior approaches have not satisfactorily answered the problems found in the operation of vertical kilns, and such problems have limited the development of larger vertical kilns and have essentially stagnated the growth of the use of vertical kilns.

According to the present invention, there is provided a process for calcining precursors of lime in vertical kilns which have at least two controlled-temperature combustion zones. The temperatures in the combustion zones are controlled in part by the gaseous mixture of combustibles entering the kiln at various levels. The vertical kiln is operated by introducing a uniform rate of stone feed from the top of the kiln into the dynamic bed in the kiln and varying the discharge rate of product to maintain a predetermined bed level of the stone in the kiln. The process requires the premixing of fuel and air prior to introduction into the kiln and control of the mixture of air and fuel entering the kiln at each of the various levels. Precise control of calcination temperature reduces overburn, with the result that the rhombic crystal structure of the product lime is not altered and, consequently, that the product lime is highly active. Temperature control according to the invention permits the use of a lower grade stone charge, which contains a high percentage of fines, without decrease in quality of the product lime. The invention provides a process which utilizes a heat input of from about 3½ to 4 million B.t.u. per ton, providing a thermal efficiency of operation in the 70 to 80% range.

The process of the invention, furthermore, provides a forced-draft combustion rather than induced-draft combustion. Thereby, the pressure of the gaseous mixture in each of the zones in the kiln is controlled so as to provide a flame control and uniform lateral distribution of products resulting from combustion and the resultant heat. The consequent effect is uniform and efficient calcination of the rock in the kiln. Efficient calcination, which reduces excess air to slightly above the amount necessary for combustion of the fuel, reduces heat losses in the stack gases, since excess air traveling through the calcining rock wastefully carries heat out of the stack. The reduced stack temperatures result in lower velocities of gas in the kiln and stack, therefore the dust loss out the stack is greatly reduced. The process of the invention, since it results in uniform lime product for a variety of grades of stone charge, allows automation of the process as a whole. The process of the invention may be practiced continuously for long durations while maintaining a quality product; prior processes, whose success was depedent upon stone charge grade, could not be automated and continuously practiced.

It is, therefore, an important feature of the invention to provide an improved process for calcining materials for the production of lime, and the like.

Another object of the invention is to provide a forced-draft calcining process for vertical kilns in the production of lime, and the like.

A further object of the invention is to provide a system which includes continuous movement of stone through a kiln without requiring stone size segregation and yields uniform quality of product without clinkers or fusion of the solids in the kiln.

A still further object of the invention is to provide a system which includes controlling the rate and temperature of heat application to stone as the stone moves through the kiln.

A yet further object of the invention is to provide a system which provides uniform temperatures horizontally throughout a vertical kiln with a controlled temperature profile vertically.

Another object of the invention is to provide a system which includes chemically combining sulfur gases with the solids in a vertical calcining kiln.

Still another object of the invention is to provide a system for calcining limestone which has high thermal efficiency and has low fuel and excess air requirements.

Yet another object of the invention is to provide a calcining process in a vertical kiln in which heat is applied at rates and at temperature levels so as not to have overburn or an adverse effect upon the crystal structure of the product solids.

And yet another object of the invention is to provide a process that has a high gas temperature quench rate so as to minimize the reaction between sulfur gas and solids.

A further object of the invention is to provide a process for the production of lime which includes at least three levels of fuel input into a vertical kiln so that the kiln may be operated with a reducing atmosphere in the top two levels to reduce sulfate and sulfite in the stone charge to sulfur gases to be removed from the product solids.

A yet further object of the invention is to provide a process that produces a minimum of particulate emission, and any particulate emission produced in such that it may be removed by simple, inexpensive particulate recovery equipment.

Another further object of the invention is to provide a process for the production of lime which includes a high concentration of carbon dioxide, which may be economically recovered as a by-product from the stack gases.

Another object of the invention is to provide a process for production of lime in a vertical kiln which includes rapidly quenching hot lime at the bottom of the kiln to prevent carbon dioxide from reacting with the solids.

Yet another object of the invention is to provide a system for the production of calcined solids in a vertical kiln which minimizes fluid channeling near the bottom of the kiln.

Still another object of the invention is to provide a system for the production of calcined solids in a vertical kiln including a forced draft operation to maintain maximum fluid density in the bed of solids to minimize pressure drops across the bed, which results in minimum powder to operate the kiln, and to provide a controlled atmosphere at all elevations in the kiln, which minimizes kiln height requirements and maximizes kiln throughput per unit of bed cross-section so that large capacity kilns may be made either portable or semi-portable.

Another object of the invention is to provide a system for the production of calcined solids which may be automated to minimize operating labor requirements.

Another object of the invention is to provide a calcining process which includes combustion of fluid fuels in a bed of stone in a vertical kiln wherein the fuel-air mixture is closely controlled for injection into at least three zones in the vertical kiln.

Yet another object of the invention is to provide a process for the production of calcined solids which includes the combustion of fluid fuels in at least two zones in a vertical kiln and includes the introduction of a fuel lean mixture into the bottom of the vertical kiln, the introduction of a fuel rich mixture into a middle portion of the kiln, and an introduction of a lean mixture in an upper part of the kiln for maximum efficiency of operation.

An additional object of the invention is to provide a forced-draft calcining process for the production of calcined solids wherein a controlled combustion of fluid fuel is provided in a vertical kiln with the inclusion of at least three zones of variable pressure in the vertical kiln.

A still further object of the invention is to maintain a fluid-solids ratio in all parts of the kiln at individual predetermined levels in the various zones in the kiln.

Another object of the invention is accurately controlling the temperature in the various zones in the kiln by varying the gas-air composition and volume to permit variation of product quality and type.

These and other objects and advantages of the invention may be readily ascertained by referring to the following description and appended illustrations in which:

FIG. 2 is a block diagram of the calcining process according to the invention;

FIG. 3 is a graph of a vertical heat profile of a vertical kiln utilizing the process of the invention, plotting temperature against height in the kiln; and FIG. 4 is a schematic view of bustle pipe around the outside of kiln.

Figure 1:
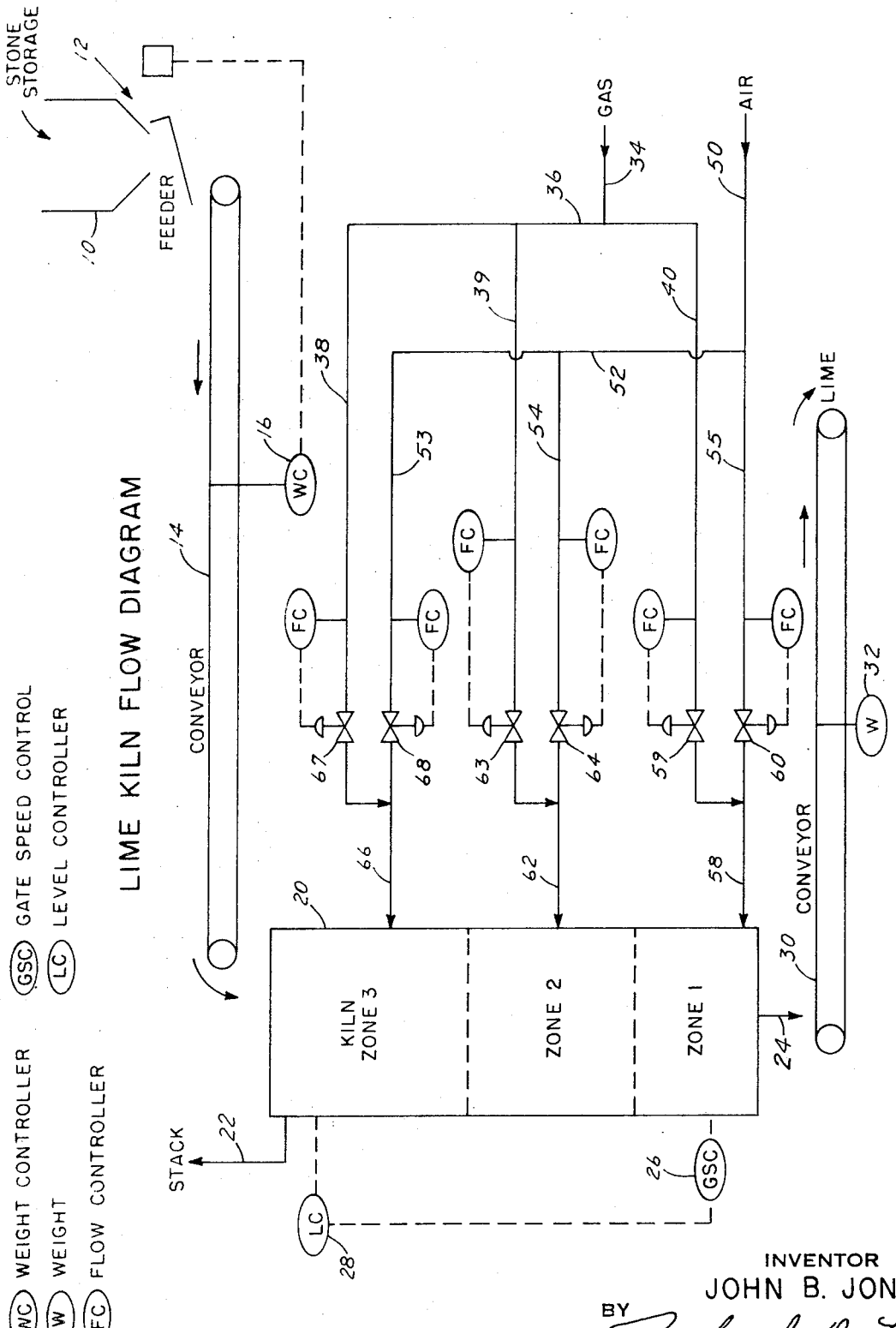
FIG. 1 is a schematic flow sheet of a calcining process according to the invention.

The diagram of FIG. 1 shows the basic equipment necessary for the process of the invention and in a general way shows the flow of material in the process. A stone storage bin 10 provided with a controllable discharge, shown in general by numeral 12, feeds onto a belt conveyor 14. A weight controller 16 mounted in conjunction with the belt conveyor 14 controls the action of the feeder to provide a uniform feed of stone from the bin, on a weight basis. Stone from the conveyor passes over a head pulley into a vertical kiln 20 which is provided with a stack for products of combustion and the calcining, and a grate, not shown, for the release of calcined solids from the kiln into a discharge outlet 24. The grate is controlled by a grate speed control 26 which, in turn, is controlled by a level controller 28. Thus, with a uniform weight rate of feed, the speed of the grate discharge mechanism is utilized to control a predetermined level in the kiln. Calcined solids are discharged from the outlet 24 onto a belt conveyor 30, and from that conveyor into a lime storage.

In one form of the invention, a gasoeus fuel is used for the combustion in the calcining, and a gas input line 34 feeds a manifold 36 from which supply lines 38, 39 and 40 pass through a flow controller. Air under pressure is supplied to the unit from a line 50 into a manifold 52 from which air lines 53, 54 and 55 emerge. The air lines are, likewise, controlled by flow controllers. The gas and air are mixed prior to the entrance into the kiln, and a different predetermined mixture of air and fuel is introduced into each of three separate zones in the kiln. An air-gas mixture is introduced into lowermost zone 1 through a line 58; the mixture of gas and air in that line is controlled by the metered amount of gas in line 40 merged with the metered amount of air in line 55. Likewise, gas line 39 merges with air line 54 into combined line 62, and gas line 38 merges with air line 53 into line 66. Line 62 leads into zone 2 above the lower zone; the mixture in that line is controlled by a gas controller 63 and an air flow controller 64. Line 66 leads into zone 3 and the mixture there is controlled by a gas flow controller 67 and an air flow controller 68.

The percentage of gas mixed with air in each of the zones is about 0.2 to 2.5% gas by volume in the mixture for zone 1, about 8% to 70% gas by volume in middle zone 2, and about 6% to 20% gas by volume in upper zone 3. Preferably, for limestone calcination the percentage volume of gas for zone 1 is about 0.3% to 1.0%, for zone 2 about 45% to 65% and for zone 3 about 10% to 15%. These mixtures give a very great excess of air for combustion (based on the gas) in zone 1, a very moderate excess in upper combustion zone 2, and a very small overall excess of air, preferably under about 25%.

The vertical kiln which is useful for the present process must have an adequate flow characteristic of the particulate material to provide a uniform flow or controlled flow of the solid material from the top to the bottom of the kiln, which includes all of the cross-sectional area of the kiln. That is, stone at the kiln wall must move equally or at constant difference with the stone at the center of the kiln. Furthermore, the distribution of the fluid material into a kiln must be adequate to provide a uniform combustion throughout the cross-sectional extent of the kiln, providing uniform treatment of all the stone particles in the bed in the kiln. A grate mechanism for providing a discharge which produces a uniform or controlled flow of stone through the kiln is shown in my U.S. Pat. No. 3,401,922, issued Sept. 17, 1968, and a distributor system for fluids to be injected into the kiln is also shown in my Pat. No. 3,432,348, issued Mar. 11, 1969.

The inlet lines 66, 62 and 58 may lead to bustle pipe manifolds to aid in the achievement of constant reactant temperatures and uniform combustion at horizontal cross-sections of the kiln. A bustle pipe 90, FIG. 4, is an annular manifold surrounding the outside of kiln 91. Distributors 92, 93 and 94 are connected at both ends to the manifold and horizontally traverse the kiln interior. Such a bustle pipe manifold or balance tube gives at constant pressure at all distributor apertures (not shown) to produce uniform fuel treatment of particulate solids in the kiln. A balance tube 95 connects to the end of bustle pipe 90 completing the annulus. The balance tube 95 is very important to produce a uniform flow into each distributor 92, 93 and 94. Any flow variation into an end of a distributor, it is balanced from the other end by the balance tube.

As explained above, with a kiln provided with a uniform feed, a uniform or controlled flow of stone bed through the kiln, and a uniform or controlled fluid distribution throughout the cross-sectional extent of the kiln, the process of the invention may be continuously and automatically conducted in the kiln. Thus, in one actual test using a 10-foot diameter kiln, limestone was fed into the top of the kiln at the rate of about 811 pounds per minutes (25.6 tons per hour). On this basis, about 6400 standard cubic feet per minute (s.c.f.m.) of air was introduced into the kiln at the bottom along with 45 s.c.f.m. of natural gas. This quantity of gas amounts to 0.70% of the gas introduced into the kiln, and the excess air added at this point is about 1350% of the theoretical amount of air needed to burn the gas. At the middle distributor about 570 s.c.f.m. of air was introduced along with 345 s.c.f.m. of nautral gas, and this amounts to 40.5% of all the gas. At the top distributor about 3060 s.c.f.m. of air was introduced along with 460 s.c.f.m. of gas, which amounts to 54.1% of all the gas. The percentage of excess air near the middle distributor was 81.6%, and the overall excess air was 19.9%. On the basis of 25.6 tons per hour, the heat input was 48.2 million B.t.u. per hour (1.88 million B.t.u. per ton of charge stone, or 3.305 million B.t.u. per ton of lime) yielding 80% efficiency based on the heat input. The power requirements were about 8–12 k.w.h./ton. The lime left the kiln at about 250° F.; combustion at the bottom of the middle zone was at about 1100° F., and at the top of the upper zone about 1300° F. The following table shows typical air and gas flow at bottom, middle, and top distributors, the feed rate (tons per hour), together with the results obtained in a kiln operating according to the invention:

| Bottom distributor | | Middle distributor | | Top distributor | | Excess air | | | Feed rate, t.p.h. | Heat input mm. B.t.u. per— | | |
|---|---|---|---|---|---|---|---|---|---|---|---|---|
| Air flow, s.c.f.m. | Gas flow, s.c.f.m. | Air flow, s.c.f.m. | Gas flow, s.c.f.m. | Air flow, s.c.f.m. | Gas flow, s.c.f.m. | Bel. mid dist., percent | Bel. top dist., percent | Over-all percent | | Hr. | Ton feed | Ton lime |
| 6,400 | 35.0 | 500 | 380 | 2,100 | 450 | 1,758 | 69 | 5.69 | 26.2 | 49.05 | 1,872 | 3.22 |
| 5,350 | 35.0 | 525 | 273 | 2,620 | 420 | 1,453 | 104 | 21.0 | 21.5 | 40.4 | 1.85 | 3.30 |
| 5,660 | 37 | 550 | 290 | 2,810 | 443 | 1,454 | 92.9 | 19.0 | 22.7 | 43.4 | 1.92 | 3.38 |
| 5,940 | 37 | 570 | 305 | 2,960 | 474 | 1,447 | 92.3 | 19.1 | 23.8 | 45.8 | 1.96 | 3.38 |
| 6,230 | 41 | 590 | 325 | 3,110 | 480 | 1,444 | 89.3 | 19.2 | 24.9 | 48.0 | 1.93 | 3.38 |
| 6,500 | 43 | 610 | 341 | 3,270 | 500 | 1,436 | 88.1 | 19.3 | 26.0 | 50.1 | 1.93 | 3.38 |
| 6,400 | 42 | 600 | 336 | 3,060 | 470 | 1,448 | 88.1 | 20.5 | 25.6 | 48.1 | 1.88 | 3.295 |

As shown in FIG. 2, the injection of the described mixtures of air and gas through distributors 84, 85 and 86 into the middle level of kiln 91 tends to produce a long, cool flames 71, 72 and 73 (relative to maximum temperature in the kiln) in the middle zone. The air-gas mixture injected into the upper zone through distributors 87, 88, 89, and 90, however, holds the long cool flame down towards the middle zone 2 and makes a hotter flame at the bottom of the upper zone 3 or the top of the middle zone. The lean gas mixture from the bottom does not burn until its temperature reaches about 1100° F. where spontaneous combustion of the gas, even though it is a very small amount of gas, takes place. The rich mixture in the middle zone is mixed with the excess air from the lower zone and heated by the sensible heat of the calcined stone, for efficient combustion. The lean mixture from the top, while holding the flame down, produces complete burning of the gas. In practice, secondary burning occurs at the upper boundary of the flame envelope of the middle zone, i.e., at 75 and 76, 77 and 78, and 79 and 80. Such secondary burning both increases the flame temperature in the region significantly and provides extremely efficient utilization of the fuel mixture. Secondary burning causes elongated flame envelopes to rise between the flame envelopes of the upper zone as shown. Fuel distributor placement is important in achieving such flame envelope profile distribution. As shown, for upper zone 3 four distributors 87, 88, 89, and 90 are equispaced horizontally across the kiln, with distributors 87 and 90 respectively being recessed into the kiln walls. The three distributors 84, 85 and 86 in the middle zone 3 are horizontally equispaced and staggered between the upper distributors. Such a staggered relationship, whether with a greater or lesser number of distributors, yields the desired secondary burning and subsequent characteristics.

In some types of calcining it may be desirable to place the distributors one above the other in a zone above a zone. This of course produces a different flame pattern, and the temperature control may be slightly different. The arrangement of the distributors, thereby, provides a means of controlling the flame profiles, which with control of the entering gas-air mixture permits accurate temperature control of the calcining process, and the residence time of the material to be calcined at predetermined temperatures. In the arrangement where the distributors are stacked one above the other, the lean gas-air mixture is injected into the cone of unburned gas from the lower distributors providing a still further control of the combustion and the resultant temperatures in the kiln. Thus, it is possible to control the intersection of the flame envelopes produced from each level of distributors. The stacking of one distributor over another permits interaction and the staggering generally discourages inner action.

The distributors may be effectively located at about 90° to the grate openings (where the grate opening extends along linear lines) to provide for a spread of the flame across the movement of the stone downwardly in the kiln.

The diameter of the distributors is maintained as small as possible to prevent restriction of the flow of stone through the kiln. The combined cross-sectional area of the distributors across the horizontal extent of the kiln at each distributor level is a minor portion of the cross-section of the kiln. Preferably, the distributors are shaped to aid the flow of stone rather than cause any restriction.

The quantity of excess air for the process, during the stable operation of the kiln, is substantially less than that used in ordinary kilns and particularly in the rotary kilns. With the mixture range given, combustion flame temperature at about the middle zone is in the range of 1950° F. and in the upper zone the temperature range is 2000 to 2300° F. The process for the average size of limestone is depicted in the illustrations of FIG. 3, which shows the temperature profile vertically in the kiln. In the upper zone, calcining is only partly completed, leaving a large core in the particles; as the stone slowly passes through the middle zone, even at the lower temperature, calcining of the interior part or core continues with the outer produced lime not being subjected to the higher temperature necessary to change the crystal structure from rhombic to cubic. This reduces the overburn of the particles. By the time the particles reach the lower zone very little, if any, core is left in the particles. The final product contains from 2 to 4% of core. Because overburn is substantially reduced, even for smaller particles, less regard need be given for the size and grade of the limestone feed charge. Lower grade raw materials, whether containing many fines or not, may be utilized with subsequent savings in raw material costs. Since limestone feed charge grade is not critical to the process, the process may be automated and run continuously. Further, since overburn is reduced, the product lime has a rhombic crystalline structure and has uniform high activity. Further still, clinkers which generally accompany overburn do not occur in limestone processed according to the invention. The product lime is not contaminated with overburned particles and the stack gases contain a minimum of particulate emission. Accordingly, the particulate emissions may be readily removed from the stack gases by simple, inexpensive particulate recovery equipment.

Apparatus may be mounted on the kiln for producing a forced-draft. Such equipment, which may be modified for use with a kiln, is conventional. Utilizing a forced-draft in the kiln controls the gaseous pressure in each of the zones of the kiln and, thereby, controls the flame and encourages uniform lateral distribution of flame and heat. Because forced-draft combustion is used with the process of the invention, the calcining process is not effected by ambient atmospheric conditions such as air density, air moisure content, or temperature.

The range of excess air below the middle distributor ranges from about 295 to 1500% of the theoretical amount of air, and below the top distributor the excess amount of air is equal to about −30 to 150% of the total amount of excess air. In the stack gas, the excess of air ranges from about −5 to a +40% of the air necessary for complete combustion of the gas. The $CO_2$ is easily recoverable as a by-product from the stack gases by conventional equipment.

The temperature in the various levels may also be controlled by the addition of $CO_2$ to the gas-air mixture. However, the quantity of $CO_2$ should not exceed about 25% of the mixture as above that quantity the combustion is extinguished. Below that figure, the excess $CO_2$ (recovered from the stack gas by conventional means) aids in control of combustion and the resultant temperature. Where the calcining does not produce $CO_2$, the inert stack gases may be recovered and recycled in a control of the combustion in the kiln. The use of the inert diluents aids in the control of the volume of gases passing through the kiln and the volumetric ratio of the solids to gas in the kiln.

The process is amenable to calcination of lime precursors such as limestone, oyster shells, gypsum, dolomitic stone, dolomite, high calmium limestone, magnesium limestone, etc. As well as calcining other materials such as iron carbonate, phosphate rock, sodium minerals (nahcolite), etc.

I claim:
1. A system for calcining particulate materials in a vertical kiln having a predetermined gravity flow of particulate material, uniform across the kiln, down through the kiln comprising:
   (a) arranging first fluid injection means at a lower zone of the kiln for injecting a mixture of fuel and air into the kiln;
   (b) arranging second fluid injection means at a middle zone of the kiln for injecting mixture of fuel and air into the kiln;
   (c) arranging third fluid injection means at an upper zone of the kiln for injecting a mixture of fuel and air into the kiln;
   (d) injecting a fuel lean mixture at said first fluid injection means;
   (e) injecting a fuel rich mixture at said second fluid injection means; and
   (f) injecting a fuel lean mixture at said third fluid injection means;
wherein said fuel lean mixture in said first injection means consists quantitively of about 70% of the total of all said fluid and air mixtures introduced into the kiln, and consists of a range of about 150–300 standard cubic feet (s.c.f.) of air to 1 s.c.f. of fuel, said first injection means being below a combustion zone in said kiln whereby said fuel lean mixture passes upwardly through a portion of said particulate material prior to entry into the combustion zone; said fuel rich mixture consists quantitively of about 6–9% of all said fuel and air mixtures injected into the kiln, and consists of a ratio of about .0–5.5 s.c.f. of air to about 3 s.c.f. of fuel; said fuel lean mixture in said third injection means consists quantitively of about 25–35% of all said fuel and air mixtures injected into the kiln, and consists of a ratio of about 5–7 s.c.f. of air to 1 s.c.f. of fuel; and said quantities of air and fuel are sufficient to produce a temperature of about 2000 to 2300° F. in the kiln at about a middle zone in the kiln and a temperature of about 2300 to 2400° F. in an upper zone in the kiln.

2. A system according to claim 1 comprising the further step of withdrawing, at the upper end of the vertical kiln, gases produced by combustion of said fuel and air mixtures and by chemical reaction at a rate sufficient to maintain pressure in the kiln above ambient pressure.

3. A system according to claim 1 wherein said mounting of the second and third fluid injection means includes placing a bustle manifold circumferentially about the kiln communicating with said injection means for introducing the mixture throughout the kiln cross-section at constant pressure, including a balance tube forming a portion of said bustle manifold.

4. A system according to claim 1 including the steps of tapping supplies of air and of fuel with a separate supply line for each of the fluid injection means, metering the flow through each of the lines, and mixing said fuel and air prior to insertion into said fluid injection means.

5. A system according to claim 1 including controlling of the quantity of reactants in the kiln and controlling the flow of fluids into said first, second, and third fluid injection means according to a particulate limestone feed rate through the kiln.

6. A system according to claim 5 wherein the total fuel fluid flow is metered to yield between 1.8 and 2.2 million B.t.u. per ton of particulate, generally pure, limestone feed.

7. A system according to claim 1 including controlling the weight of unreacted particulate materials to the kiln and controlling the flow of fluids out of said first, second and third fluid injection means according to the rate of input of unreacted particulate materials to the kiln.

8. A system according to claim 1 including preheating the particulate materials at the top of the vertical kiln.

9. A system according to claim 1 including forcing draft air through the kiln to maintain pressure in said kiln above ambient pressure.

10. A system according to claim 1 wherein said first, second, and third fluid injection means include horizontal, spaced fluid distributors, and including staggering said distributors of said second means so as to be laterally between said distributors of said third means.

11. A process according to claim 1 wherein limestone is calcined to lime by the combustion of fuel-air mixtures injected into said kiln through said fluid injection means.

12. A process according to claim 11 wherein the output of lime is matched with the input of limestone to maintain a predetermined level of the bed of particulate material in said kiln.

13. A process according to claim 1 wherein said second and third fluid injection means includes a series of linear distributors in each said zone, and the distributors of said upper zone are spaced directly above the distributors of said middle zone.

14. A process according to claim 1 wherein said second and third fluid injection means includes linear distributors arranged at 90% to linear outgrate openings in the bottom of said kiln.

15. A process according to claim 1 wherein said fluid injection means include linear distributors, thereby providing three levels of fluid distribution in said kiln.

References Cited
UNITED STATES PATENTS

| | | | |
|---|---|---|---|
| 3,544,090 | 12/1970 | Peeters | 263—29 |
| 3,204,936 | 9/1965 | Beckenbach | 263—29 |
| 3,544,093 | 12/1970 | Fisher | 263—29 |
| 3,142,480 | 7/1964 | Azbe | 263—29 |

JOHN J. CAMBY, Primary Examiner

H. C. YUEN, Assistant Examiner

U.S. Cl. X.R.

34—171

UNITED STATES PATENT OFFICE
CERTIFICATE OF CORRECTION

Patent No. 3,743,697                     Dated July 3, 1973

Inventor(s) John B. Jones, Jr.

It is certified that error appears in the above-identified patent and that said Letters Patent are hereby corrected as shown below:

Col. 2, line 20, after "changed", insert -- in -- .

Col. 7, line 64, "intersection" should read --interaction--.

Col. 9, line 11 - "calmium" should be --calcium--.

Col. 9, line 47 ".0-5.5 s.c.f. of air" etc. should be
        --2.0-5.5 s.c.f. of air-- etc.

Signed and sealed this 13th day of August 1974.

(SEAL)
Attest:

McCOY M. GIBSON, JR.           C. MARSHALL DANN
Attesting Officer              Commissioner of Patents